United States Patent Office 3,101,255
Patented Aug. 20, 1963

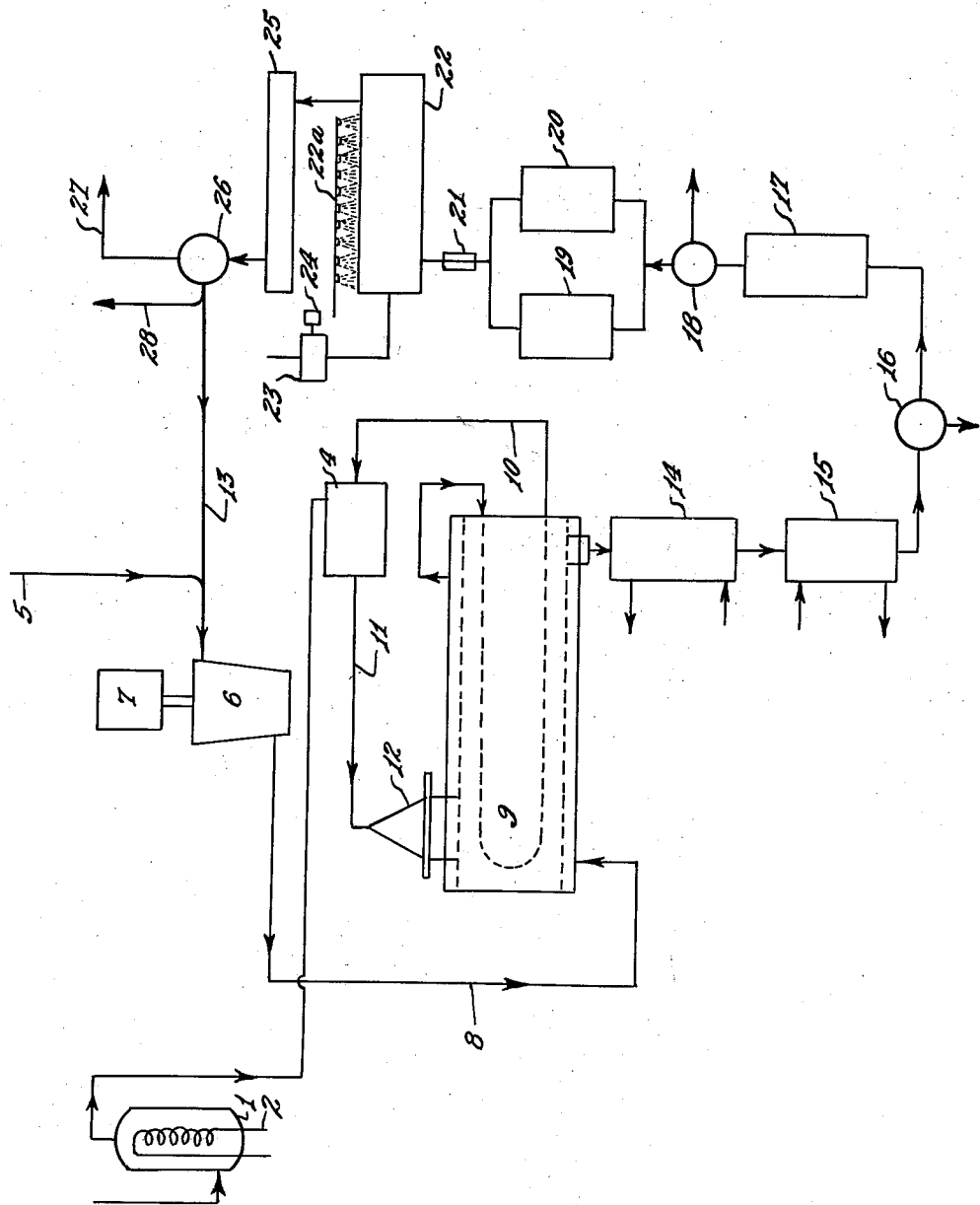

3,101,255
MANUFACTURE OF NITROGEN TETROXIDE
Dugald M. Carr, Milford, and Theodore D. Striggles, Cincinnati, Ohio, assignors to The Chemical and Industrial Corp., Cincinnati, Ohio, a corporation of Ohio
Filed Feb. 27, 1957, Ser. No. 642,897
11 Claims. (Cl. 23—162)

The invention relates to the manufacture of nitrogen tetroxide ($N_2O_4$) which has well recognized uses in industry. Nitrogen tetroxide can be used in almost all of the applications for nitric acid, and forms nitric acid when brought into association with water. Being a liquid at or below 21.3° C. (about 73° F.), nitrogen tetroxide is more economically shipped and stored than is nitric acid.

Various ways of making nitrogen tetroxide from nitrogen bearing substances have hitherto been suggested, including the synthesis of nitrogen tetroxide from ammonia. In this connection it has been understood that nitrogen dioxide ($NO_2$) is capable of polymerizing at relatively low temperatures to form $N_2O_4$. However, prior art workers have not been able to synthesize $N_2O_4$ from ammonia without producing as a by-product large quantities of weak nitric acid. This increases the necessary outlay for equipment, and greatly decreases the theoretical economic advantage of producing $N_2O_4$ in pure form.

A fundamental object of the invention, therefore, is the provision of a process by which nitrogen tetroxide may be economically produced in pure form.

Another object of the invention is the provision of a method for the synthesis of $N_2O_4$ from ammonia without the production of by-products presenting a disposal problem.

These primary objects and others which will be set forth hereinafter or will be apparent to one skilled in the art upon reading these specifications, are accomplished by that procedure and use of apparatus of which an exemplary embodiment will now be described. The accompanying drawing illustrates diagrammatically an assembly of apparatus with which the invention may be practiced.

The process of the invention is based on a number of discoveries. It has been found possible to produce nitric oxide from ammonia in the absence of excess oxygen and with the production of a minimum quantity of water. It has been found possible to dehydrate the gases containing nitric oxide as an incident to cooling them as hereafter explained, so as to arrive at a gaseous mixture consisting essentially of nitric oxide and nitrogen at a relatively low temperature. It has been found possible to oxidize this mixture with air so as to form nitrogen dioxide, and then to cool the oxidized mixture with the polymerization of $NO_2$ to $N_2O_4$ and with the condensation and separation of the $N_2O_4$ from the residual nitrogen, under such conditions that any moisture introduced with the air used for oxidizing the nitric oxide will pass out of the system with the residual nitrogen. This provides substantially pure nitrogen tetroxide without by-products presenting a disposal problem.

The drawing shows diagrammatically an exemplary apparatus assembly. In the practice of the invention liquid ammonia from any suitable vessels may be introduced into an ammonia vaporizer 1 having a steam coil 2 for heating. The vaporized ammonia gas under pressure will be carried by a conduit to a mixer and filter indicated at 4. Air entering the system at 5 will be placed under suitable pressure by a compressor 6 driven by a motor 7, and will be carried by a conduit 8 to a heat exchanger or air heater 9. From the heat exchanger the air passes through a conduit 10 to the mixer and filter 4 wherein it joins the ammonia gas. The mixed air and ammonia will be conducted by a conduit 11 to the converter 12 which will be of the type generally used in nitric acid plants for the oxidation of ammonia. Thus the converter may incorporate platinum gauze catalyst or may employ platinum, rhodium, palladium or other effective catalysts or combinations thereof on any suitable support.

The temperatures given in this specification are exemplary and may be varied. The temperature of the ammonia will have been increased by pressure and by heating in the vaporizer so that the ammonia gas will enter the mixer 4 at a temperature say of the order of 150° F. The temperature of the entering air will have been increased (say to around 275° F.) by compressing it, and will be further increased to around 577° F. by the heat exchanger 9. Thus the mixture of air and ammonia delivered to the converter 12 should have a temperature of about 500° to 540° F.

The usual oxidation reaction occurs in the converter 12. In order to avoid an explosion hazard when the air is mixed with the ammonia, it is preferred to reduce the oxygen content of the air from the normal atmospheric value to about 12%. This can be accomplished by bleeding controlled amounts of nitrogen into the entering air line 5 through a conduit 13, the nitrogen being derived from a later stage of the process as hereinafter explained.

The amount of air mixed with the ammonia before delivery to the converter, and based upon the oxygen content of the air, will be substantially the quantity required to oxidize the ammonia to NO, there being preferably a slight excess of ammonia, say of the order of 1%.

Reaction in the converter 12 will be started by a suitable heating or sparking device; and the oxidation of the ammonia will raise the temperature of the gases to a value above 1700° F. In an exemplary procedure in which the mixture of air and ammonia entered the converter at 517° F. the temperature of the gases leaving the converter is 1742° F. These hot gases are sent through the air heater 9 in heat exchange relationship with the air passing therethrough as above described. When the gases leave the air heater they have lost some of their heat but are still at a relatively high temperature, say around 1400° F. or higher. It is economical to endeavor to recover this heat, so that the gases are passed through a waste heat boiler 14 of known form. Steam is generated in this boiler which may be employed for power purposes, and the temperature of the oxidized gases after their passage through the boiler may be of the order of about 500° F. depending upon the type and efficiency of the boiler. The gases consist essentially of nitrogen and nitric oxide with small quantities of moisture and hydrogen, the hydrogen being derived from the dissociation of ammonia in the absence of sufficient oxygen to convert the hydrogen into water vapor.

Gases are next further cooled to a temperature below the boiling point of water as in a cooler 15. This cooler may take various forms but is preferably and conveniently a heat exchange apparatus in which the coolant is water. In an exemplary procedure, the temperature of the gases coming out of the cooler 15 is about 100° F. The greater part of the moisture in the gases will have condensed and the condensed moisture is removed from the gases by a trap or separator 16 of known form.

The gases are next further cooled to a temperature of about 30° to 38° F. in a cooler 17. This is a heat exchange apparatus employing any suitable coolant. Normally mechanical refrigeration will be employed, directly or indirectly. Further moisture will be condensed in the gases and may be removed by a trap or separator 18.

To remove the last traces of moisture, the gases are preferably sent through parallel water absorbers 19 and 20. These may make use of silica gel or other water absorption media. The parallel absorbers are used alternately, one being regenerated while the other is operating to remove moisture.

The cooled and dehydrated gases may be passed through a filter 21 into an oxidation chamber 22. In this chamber they are mixed with air which is introduced into the chamber from a compressor 23 driven by a motor 24. The air so introduced may be atmospheric or undiluted air; and it will be introduced, based on its oxygen content, in substantially stoichiometric quantity for the oxidation of the nitric oxide to nitrogen dioxide ($NO_2$). This oxidation occurs readily at the low temperatures involved and does not require a catalyst. The reaction is somewhat exothermic. It will be usual to provide the oxidation chamber with a cascade water cooling system indicated at 22a to prevent too great a rise in temperature. Thus, by way of example, if the gases enter the oxidation chamber at a temperature of about 45° F., they can be made to exit from the chamber at a temperature of about 100° F.

It is necessary now to cool the gases further. This is accomplished by a cooler 25 which employs mechanical refrigeration directly or indirectly, and serves preferably to reduce the temperature of the gases to about 50° F. In the cooler 25 the nitrogen dioxide polymerizes to nitrogen tetroxide. No catalyst is required for this polymerization. The temperature of about 50° F. may be varied, but the temperature should be low enough not only to facilitate the polymerization of the nitrogen dioxide but also to condense the nitrogen tetroxide formed by such polymerization. Thus the temperature must be below about 73° F.

The condensed nitrogen tetroxide can be removed from the system by a trap or separator 26, and taken out of the system at 27 for storage, shipment and sale or use. The gas from which the nitrogen tetroxide is so separated will consist essentially of nitrogen. The air entering the oxidation chamber 22 may be dehumidified if desired, but this is not ordinarily necessary. The small quantity of water vapor which it may contain, will pass out of the system with the nitrogen from the separator 26. Under the conditions obtaining in the system it has substantially no tendency to react with the nitrogen tetroxide to form nitric acid. The nitrogen from the separator 26 may be exhausted from the system as at 28; but since this nitrogen may conveniently be used for diluting the air entering the system at 5 (as above explained) the conduit 13 is connected to the conduit 28 as shown.

The apparatus has been illustrated diagrammatically in the figure but in the light of the teachings herein it will be within the competence of the skilled worker in the art to select suitable embodiments of individual elements having proper capacities and characteristics. The use of flow meters, control valves, pressure controllers, proportioning devices, temperature recorders and the like, though not illustrated, will be in accordance with good engineering practice. If the effluent gases at 28 are found to contain any quantities of oxides of nitrogen, these may be destroyed by burning with fuel or catalytically as taught in our copending application Serial No. 592,975, filed June 21, 1956, now abandoned.

Modifications may be made in the invention without departing from the spirit of it. The invention having been described in an exemplary embodiment, what is claimed as new and desired to be secured by Letters Patent is:

1. A process for the manufacture of nitrogen tetroxide which comprises catalytically reacting substantially stoichiometric proportions of ammonia and oxygen in the presence of nitrogen, there being present a slight excess of ammonia to form gases consisting essentially of nitric oxide, nitrogen and water vapor, cooling the said gases and extracting substantially all of the said water vapor therefrom, thereafter reacting the nitric oxide therein with substantially stoichiometric proportions of oxygen to form nitrogen dioxide, and immediately cooling the said gases to cause said nitrogen dioxide to polymerize to nitrogen tetroxide and to condense the said nitrogen tetroxide to a liquid, and separating the said liquid from the remainder of said gases.

2. The process of claim 1, in which the oxygen and nitrogen are mixed with the ammonia in the form of air diluted with nitrogen so as to have an oxygen content not exceeding about 12%.

3. The process of claim 2 in which the gases from the first oxidizing reaction are cooled to a temperature of at most about 50° F. and dehumidified, before being reoxidized as set forth, and in which the reoxidized gases are then again cooled to a temperature of at most about 50° F. for the formation and separation of nitrogen tetroxide.

4. The process of claim 3 in which the gases in the system are at a pressure of 45 to 170 p.s.i.g.

5. The process of claim 3 in which the gases containing nitric oxide are passed through a water absorption means containing silica gel before reoxidation.

6. The process claimed in claim 3 in which nitrogen separated from said nitrogen tetroxide is employed for diluting said air.

7. A process for the manufacture of nitrogen tetroxide which comprises diluting air with nitrogen to an oxygen content of about 12%, compressing and preheating said air and mixing said air with ammonia gas to give substantially stoichiometric proportions of oxygen and ammonia for the formation of nitric oxide, catalytically producing a complete reaction between said oxygen and ammonia to form said nitric oxide in association with nitrogen and water vapor, whereby said gases reach a high temperature of the order of 1700° F., passing said gases in heat exchange relationship with the incoming air whereby partially to cool them, further cooling said gases to about 50° F. and dehydrating them, mixing the dehydrated gases with air to oxidize the nitric oxide to nitrogen dioxide, again cooling said gases to about 50° F. to cause the nitrogen dioxide to polymerize to nitrogen tetroxide and condense the latter to a liquid, and separating said liquid from the gases.

8. The process of claim 7 in which gases separated from said nitrogen tetroxide are employed for diluting said air.

9. The process of claim 7 in which the gases from said first oxidation reaction are passed through a waste heat boiler to recover heat values therefrom.

10. The process of claim 7 in which the gases from said first oxidation reaction are passed through a waste heat boiler to recover heat values therefrom, and in which said gases are thereafter successively cooled by water cooling followed by mechanical refrigeration, the water vapor being separated therefrom first mechanically, then by absorption means.

11. The process of claim 10 in which water cooling is applied to the gases during the second oxidation step.

References Cited in the file of this patent

UNITED STATES PATENTS

| | | |
|---|---|---|
| 1,735,342 | Taylor et al. | Nov. 12, 1929 |
| 1,989,267 | Caro et al. | Jan. 29, 1935 |
| 2,018,249 | Caro et al. | Oct. 22, 1935 |
| 2,135,733 | Richardson | Nov. 8, 1938 |